H. I. PERSSON.
SAFETY HOLDER FOR STIRRUP STRAPS.
APPLICATION FILED NOV. 21, 1918.
1,323,311.
Patented Dec. 2, 1919.
2 SHEETS—SHEET 1.
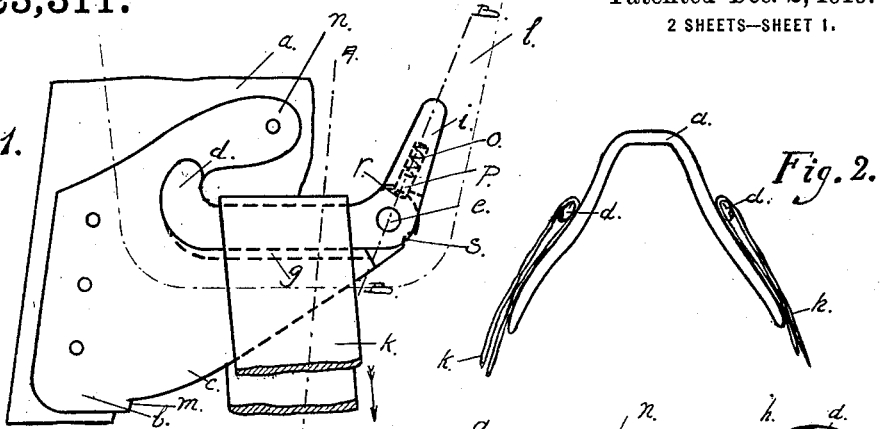
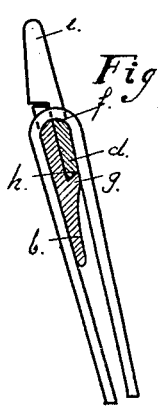
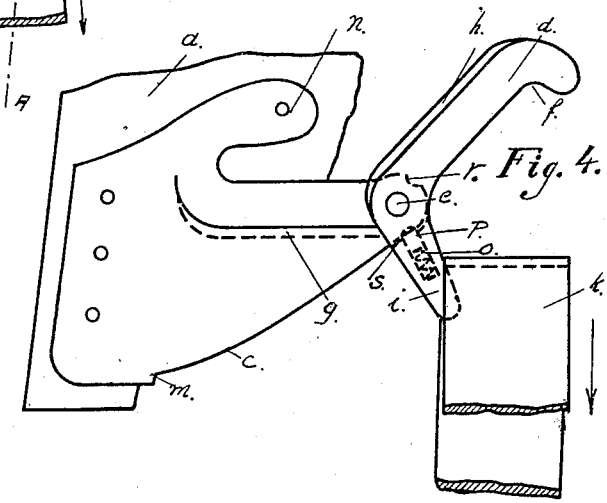
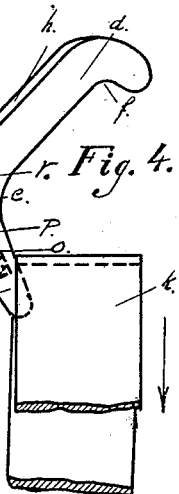
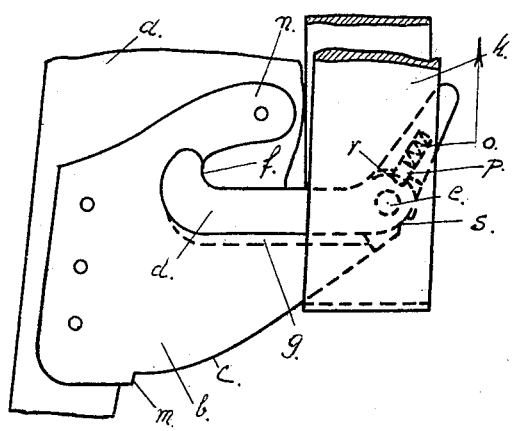
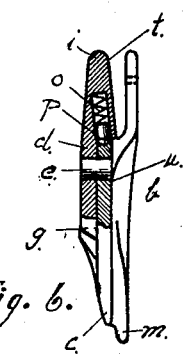
INVENTOR:
Hans Ivar Persson
By Wm Wallace White
ATTY

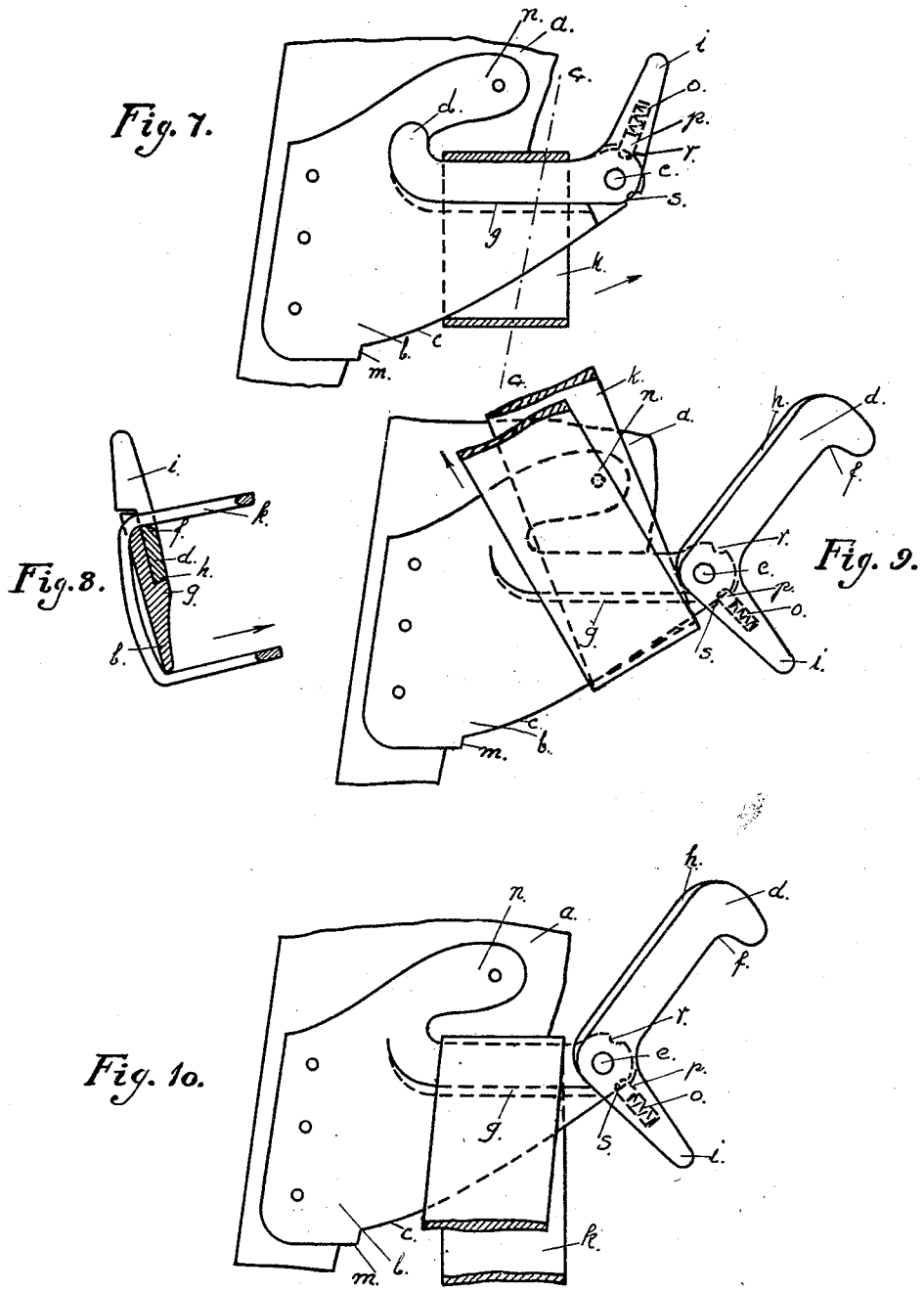

UNITED STATES PATENT OFFICE.

HANS IVAR PERSSON, OF GOTTENBORG, SWEDEN.

SAFETY-HOLDER FOR STIRRUP-STRAPS.

1,323,311. Specification of Letters Patent. Patented Dec. 2, 1919.

Application filed November 21, 1918. Serial No. 263,486.

*To all whom it may concern:*

Be it known that I, HANS IVAR PERSSON, a subject of the King of Sweden, residing at Gottenborg, in the county of Gottenborg and Bohus and Kingdom of Sweden, have invented new and useful Improvements in Safety-Holders for Stirrup-Straps, of which the following is a specification.

This invention refers to holders for stirrup-straps and has for its object to facilitate the automatic release of the strap in case of emergency. Safety holders for stirrup straps are already known, which are designed in such a manner, that the strap, when in working order, is suspended from a holder of angular shape attached to a bracket on the saddle. Such holders are not rigidly fixed to the said bracket, but may be allowed to pivot, so that if the rider should happen to fall from his horse with his foot resting in the stirrup, the stirrup-strap will be pulled backward causing the holder to swing about its pivot to a releasing position, and the strap will slip off from the holder.
Such safety holders, as hitherto known, will as a rule admit of the said automatic detachability of the strap only in case the rider falls to that side of the horse, from which the stirrup fastened to his foot is suspended.

If he falls to the opposite side, the stirrup-strap will be pulled upward across the saddle entangling itself with its suspension device in such a manner that it cannot slip off.

This invention has for its object to avoid this trouble and to insure the loosening of the stirrup strap, if the rider should fall from his saddle with both of his feet fast in the stirrups, or with only the one foot entangled in that stirrup which is attached to the opposite side of the saddle. The improved holder is characterized thereby, that the lower edge of the bracket plate mentioned carrying the releasing angle-piece is inclined upward and backward, thus permitting the stirrup-strap, when pulled in an upward direction, to slide along the said edge and to slip off from its holder.
The lower edge of the bracket plate further is provided with a step, against which the stirrup-strap is retained, when being pulled forward, thus protecting the inside saddle piece from becoming chafed.
This invention also provides means for the stirrup-strap to detach itself, if it be pulled in an outward direction, when the rider falls from his saddle. This is caused by the strap slipping along the lower inclined edge *c* of the plate *b*. Furthermore the invention has for its object to prevent the stirrup-straps from becoming unintentionally detached, when they are laid across the saddletree, as is generally the case when riding without stirrups (balance-riding), and the stirrup-straps are also prevented from slipping off the holders, when the horse is led along unmounted with the straps hanging slack from the saddle.

In the accompanying drawing a part of the saddle is illustrated together with the improved stirrup-strap holder.

Figure 1 illustrates an elevation side view of the device in normal operating position.

Fig. 2 illustrates on a smaller scale a front view of the saddle-tree with the stirrup-straps attached.

Fig. 3 illustrates a cross section through the device on the line A—A in Fig. 1.

Fig. 4 illustrates a side view of the device with the angular holder in releasing position and the stirrup-strap slipped down and ready to drop.

Fig. 5 illustrates a side view of the device in normal operating position, but with the stirrup-strap pulled upward and across the back of the animal.

Fig. 6 illustrates a vertical section of the back part of the holder along the line B—B in Fig. 1.

Fig. 7 illustrates a side view of the holder in its ordinary working position showing the stirrup-strap being pulled in a lateral direction.

Fig. 8 illustrates a section along the line C—C in Fig. 7 showing the stirrup-strap in the same position as in Fig. 7.

Fig. 9 illustrates a side view of the holder in releasing position with the stirrup-strap thrown across the saddletree as is usual in the case of balance-riding.

Fig. 10 illustrates a side view of the holder and the stirrup-strap hanging slack from the saddle; the horse being unmounted.

On each side of the saddle-tree *a*, at the place where the stirrup-strap generally is attached, a bracket or supporting plate *b* is mounted. The lower edge *c* is inclined upward and backward.

This bracket-plate extends upward and backward forming a tongue *n*.

At the back end of the plate *b* a V-shaped angular holder *d* is attached by means of a pivot *e*, around which the member *d* may swing. In its normal position the holder $d$ rests against a shoulder $g$ on the plate $b$. This shoulder $g$ is of a particular shape, and the corresponding bottom edge $h$ of the holder $d$ is fitted against the shoulder $g$, so as to secure the holder from any lateral movement. The rear part or projection $i$ of the holder $d$ is inclined at a suitable angle to the central part $f$ and is extended upward and backward, so that, when the holder is in its normal position, the back edge of the projection $i$ is approximately in line with the bottom edge $c$ of the plate $b$, see Figs. 1, 5 and 7.

The projection $i$ is provided with a recess containing a spiral spring $o$ acting on a pin $p$, which is able to enter into either of the notches $r$ and $s$ on the bracket-plate $b$. The notch $r$ is intended to keep the holder in its normal position (Fig. 1) with a certain amount of resistance against being displaced. The other notch $s$ is intended to keep the holder locked in its released position as shown in Figs. 9 and 10. The projection $i$ is of such thickness, that its inside outline $t$ runs in line with the outline $u$ of the bracket-plate.

The upper edges of the holder $d$ and of the plate $b$ are suitably situated both at the same height—Fig. 3— in order to provide a sufficiently large surface of contact for the stirrup-strap $k$, the upper end of which is shaped into a loop slipped on to the straight part $f$ of the angular holder $d$ and over the upper edge of the plate $b$—see Figs. 1 and 3.

The improved device thus described operates as follows:

If the rider should fall from his saddle with his foot or both of his feet entangled in the stirrup or stirrups, the result will always be that the stirrup-strap, which is suspended from that side of the saddle, toward which the rider falls, will be pulled in a backward direction, causing the loop of the strap to slide up against the projecting horn $i$ of the holder $d$. The holder will consequently swing about the pivot $e$—see Fig. 4—, and the stirrup-strap will slip off from the holder. If at the same time the stirrup-strap suspended from the opposite side of the saddle be pulled upward and across the top part of the saddle, its loop will slide upward along the inclined edge $c$ of the plate $b$ and along the back edge of the projection $i$, until this strap also becomes loose—see Fig. 5. As the edge $c$ of the plate and the back edge of the projection $i$ are nearly in line, the slipping of the strap meets with no obstacle and consequently cannot fail in operation.

On account of the pin $p$ catching the notch $r$ the holder is prevented from moving to released position, when subjected to any slight pressure against the projection $i$.

The notch $s$ comes into use when riding without stirrup-straps, and the stirrup-straps are thrown across the saddletree. In this case the straps are prevented by the projection $i$ from slipping backward along the edge $c$ and thus becoming inadvertently detached (see Fig. 9). Also when the horse is led along unmounted, the holder fixed in its released position prevents the stirrup-straps from slipping off (see Fig. 10), and the holder $d$ is prevented from falling into its normal position by the pin $p$ catching into the notch $s$. If the pin $p$ and notch $s$ were missing, the holder $d$ would be liable to fall back into its normal position (see Fig. 1), and the stirrup-strap would thus be jammed up against the tongue $n$.

The lower edge $c$ of the plate $b$ is provided with a step $m$, against which the stirrup-strap is retained when being stretched in a forward direction, and is thus prevented from chafing the surface of the inside saddle piece.

The extension or tongue $n$ of the upper part of the plate prevents the stirrup-strap from being excessively jerked up and down when riding.

The coöperating surfaces of holder $d$ and bracket $b$ are laterally tapered inward in order to provide a rigid support for the holder against laterally acting forces.

The inclined lower edge $c$ of the bracket $b$ insures a safety operation of the holder $d$ even if the stirrup-strap should be stretched straight aside out from the horse's side, whereby the strap is caused to slide upward along the said inclined edge $c$ and acts upon the horn $i$, so as to tip the holder (Figs. 7 and 8).

In all the figures the arrows illustrate the direction into which the pulling forces act upon the strap and consequently how the motion of the strap, if any, is caused to occur.

Having thus particularly described and ascertained the nature of my said invention, and in what manner the same is to be performed, I declare that what I claim is:

A safety stirrup-strap holder comprising a plate adapted to be secured to a saddletree, a holder pivoted to the plate and capable of occupying either holding or releasing position, a projection formed on the rear end of the holder, said projection being tapered in cross section toward its upper edge while the latter is rounded, and means for temporarily locking the plate in either holding or releasing position.

In testimony whereof I have affixed my signature in presence of two witnesses.

HANS IVAR PERSSON

Witnesses:
 GUSTAF GERTI,
 G. OSCAR OLSSON.